(12) United States Patent
Schwaderer et al.

(10) Patent No.: US 6,393,496 B1
(45) Date of Patent: May 21, 2002

(54) OPERATING SYSTEM AND NETWORK INDEPENDENT APPLICATION PROGRAM INTERFACE FOR USE IN AN INTELLIGENT COMMUNICATION DEVICE

(76) Inventors: Curtis A. Schwaderer, 2707 64th St., Des Moines, IA (US) 50322; Eric B. Miller, 10154 NW. 80th La., Grimes, IA (US) 50111; Brent A. Thompson, 6922 Northview Dr., Urbandale, IA (US) 50322

( * ) Notice: Subject to any disclaimer, the term of this patent is extended or adjusted under 35 U.S.C. 154(b) by 0 days.

(21) Appl. No.: 08/603,790

(22) Filed: Feb. 20, 1996

Related U.S. Application Data

(63) Continuation-in-part of application No. 08/555,562, filed on Nov. 9, 1995.

(51) Int. Cl.[7] ................................................. G06F 9/54
(52) U.S. Cl. ........................................ 709/328; 709/322
(58) Field of Search .......................... 395/200.03, 680, 395/68 H, 682; 709/200–253, 310–332

(56) References Cited

U.S. PATENT DOCUMENTS

| | | | |
|---|---|---|---|
| 4,768,150 A | * | 8/1988 | Chang et al. ............... 709/328 |
| 5,351,276 A | * | 9/1994 | Doll, Jr. et al. ........... 379/88.17 |
| 5,499,343 A | * | 3/1996 | Pettus ......................... 709/203 |
| 5,533,116 A | * | 7/1996 | Vesterinen .................. 379/243 |
| 5,557,798 A | * | 9/1996 | Skeen et al. .................. 705/35 |
| 5,590,128 A | * | 12/1996 | Maloney et al. ............ 370/260 |
| 5,754,765 A | * | 5/1998 | Danneels et al. ........... 709/222 |
| 6,021,445 A | * | 2/2000 | Chapa ......................... 709/328 |
| 6,047,319 A | * | 4/2000 | Olsen .......................... 709/223 |

* cited by examiner

*Primary Examiner*—St. John Courtenay, III
(74) *Attorney, Agent, or Firm*—Daniel A. Rosenberg; Kent A. Herink; Davis Brown Law Firm

(57) ABSTRACT

An application interface for an intelligent communication device. The intelligent communication device is connected to a network with at least one server connected thereto. The intelligent communication device includes an operating system. The application interface allows for application program to run on the intelligent communication device while be written independently of the operating system and the network. In a specific implementation, the application interface can be used in an interactive television system. The interactive television system includes a set top box decoder connected to a network with at least one server attached. The set top box decoder is a digital computer device which utilizes an operating system. The application interface includes an application program interface and a media control layer.

20 Claims, 7 Drawing Sheets

OPERATING SYSTEM AND NETWORK INDEPENDENT APPLICATION PROGRAM INTERFACE FOR USE IN AN INTELLIGENT COMMUNICATION DEVICE

CROSS REFERENCE TO RELATED APPLICATIONS (Claiming Benefit Under 35 U.S.C. 120)

This application is a continuation-in-part of U S. application Ser. No. 08/555,562 filed Nov. 9, 1995 now abandoned by C. Schwaderer et al.

AUTHORIZATION PURSUANT TO 37 CFR 1.71 (d)(e)

A portion of the disclosure of this patent document, including appendices, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention relates generally to networked client/server and multimedia systems, and particularly to a standardized interface for high level software which is independent of the operating system and network.

2. Background Art

Interactive television systems are being developed and tested by various telephone and cable companies. These systems will allow users to interact with large computer systems operated by the telephone and cable companies via their television sets. The potential for interactive television is great. Users of the systems will be able to access movies on demand, pay bills, bank, shop, place orders, make reservations, participate in interactive games and forums, access informational data bases and perform numerous other functions in addition to accessing the traditional television stations.

The interactive systems are designed to allow for two-way digital communication between the providing company, also known as the contact provider, and the user. In the systems under development by the telephone companies, the communication will be accomplished over existing telephone lines. However, as mentioned, the communication will be digital, not analog, which will allow for much higher data transfer rates which are required, for example, to access a movie. The use of the telephone lines for two-way multimedia interaction has been called video dial tone. In the case of the systems being developed by the cable companies, the existing cable line will be used. As with the telephone systems, the communication will be two-way and will be digital. Appropriately, the cable based interactive television systems have been referred to as digital two-way cable. In both the telephone and cable systems, the communication can be a combination of digital and analog signals.

The goal of the systems is to provide a user friendly interface at the user end. The systems require that the user have a computer/decoder similar to the need for having a cable decoder in traditional cable systems. These computer/decoders for the interactive television systems have become known as set top boxes referring to the fact that these boxes will be set on top of the television set, or at least in close proximity. Each set top box will include a remote control which will provide for the user interface and interaction between the user and the interactive television system. Other input devices can also be used to customize the manner in which selections are made. Thus, the user will access the services of interactive television, make decisions, enter choices, play games and the like using the remote control and other input devices.

For example, a user may decide that she wishes to watch a movie. Using the remote control, the user will select the movie category from an option menu. The user then makes appropriate selections from the menu driven choices, using the remote control, until she has selected the particular movie she wishes to watch. At this point the interactive television system accesses the information for this movie and prepares to begin downloading it, segment by segment, to the set top box. At the user end, the remote control now functions similarly to a remote control for a VCR. Thus the user can play, pause, rewind and fast forward. The set top box controls the two-way communication. It sends the commands from the user to the interactive television system as well as accepts the digitized movie information, encoded in MPEG (Motion Picture Experts Group) or MPEG 2 format, for example, and converts it into a format acceptable to the television such as NTSC, PAL, HDTV or SECAM.

In the case of users placing orders, and for illustrative purposes, the specific example of a user placing a food order, the user might select, utilizing the remote control, the restaurant selection from an options menu. In well developed systems, the user could then select the listing of restaurants by some sort of preference. For example, the user may select by type of cuisine, by restaurants offering carry-out or delivery, in order of proximity to the user, alphabetically within a certain radius of the user, and so on. If the user selects pizza restaurants offering delivery, the appropriate list will be displayed for the user. The user then selects the particular restaurant, type of pizza, payment method, preference for delivery time, maximum wait time and any other relevant information for which the system prompts. The system will then automatically place the order with the pizza restaurant.

The basic components of the interactive television system include the television, the set top box, the network and the servers. As described above, the set top box is connected to the television and the network and decodes the information received from the network as well as sending information to the network. Numerous servers are also connected to the network. These servers are accessed by the set top box in order to accomplish the interactive services discussed above. For example, the set top box may access one particular server via the network if the user desires to watch a movie and may access another server if the user wishes to place a dinner order.

The set top box is a digital computer device on which application programs are run. As a digital computer device, the set top box includes an operating system such as Microware System Corporation's OS-9, OS-9000 or DAVID Operating System which is essentially an operating system based either on OS-9 or OS-9000 with additional system modules necessary in an interactive television environment. Additionally, numerous other operating systems exist. Each operating system may operate under a unique protocol which is to say that each operating system may have its own unique set of system calls. Likewise, each network and each server may have its own protocol.

The interactive television system is a networked multimedia system, specifically, and a networked client/server, generally. The television is the client and accesses the servers via the network. Many other communication environments utilize the networked client/server arrangement. In many of these environments the client is an intelligent communication device which is capable of running application or high-level software.

In typical client/server systems and as with personal computers, the application program must be written dependent upon the particular operating system. Additionally, the application program must be written dependent upon the particular network and server. Therefore, application software developers must create different versions of their software for each combination of operating system, network and server. Because of the great number of operating system, network and server permutations, the application software developers are highly burdened as they seek to provide software for each possible system combination. As a practical matter, many platform combinations will be left without a compatible application program. This problem is not limited to the interactive television environment but also exists any virtually any networked, client/server environment.

Thus, generally, there is a need for an application interface in an intelligent communication device which allows for application software developers to develop application programs in a manner independent of the operating system and of the network and, specifically, a need for an application interface for use in an interactive television environment.

DISCLOSURE OF THE INVENTION

The present invention relates generally to networked client/server and multimedia systems, and particularly to a standardized interface for high level software which is independent of the operating system and network. The networked client/server or multimedia system such as an interactive television system includes a television, a set top box or decoder, a network and at least one server attached to the network. Typically, numerous servers will be connected to the network and accessible to the set top box via the network. The television and set top box could also be a computer and a monitor. Additionally, the standardized interface of the present invention can be contained and utilized in other intelligent devices which are part of a networked, client/server system such as cellular telephones, personal digital assistants (PDA's), personal computer/work station environments, smart phones, pagers and wireless communication networks. It should be understood that in some network environments, the server for one particular client may be another client. For example, in a cellular telephone system the client is a cellular telephone and the server is another cellular telephone which is also a client. Thus in some circumstances, while still accurately described as two separate client/server connections via a network, it may be easier to understand the communication structure by viewing it as two clients connected by a network.

In the interactive television environment, the set top box is a digital computer device and includes an operating system. The operating system is either resident in the set top box or is downloaded from the network. Application programs are software programs which run on the set top. The application programs access servers via the set top box, its operating system and the network to provide the various services available on an interactive network. Similarly, in other networked, client/server systems, application programs or system modules may be downloaded to various other intelligent devices. For example, a PDA might access servers in a similar manner.

The present invention includes an application program interface functionally positioned between the application and the operating system. The application program interface includes an application interface portion and an operating system interface portion. The application interface portion receives input/output (I/O) calls from the application program which has been written in a standardized format. The application interface portion is operating system and network independent.

The operating system interface portion receives the standardized I/O calls from the application interface portion and translates them into the appropriate calls for the particular operating system in use on the set top box. The operating system interface portion is operating system dependent. Thus, the application program interface with its operating system dependent operating interface portion allows an application program to be written using standardized system calls which are independent of the operating system.

The present invention also includes a media control layer functionally positioned between the operating system and the network. The media control layer receives operating system I/O calls from the operating system and translates the data or requests into a message or packet the network will understand. Use of the media control layer allows application program and operating system operation in a manner which is independent of the network requirements. A network device driver can also be included functionally positioned between the network and the media control layer. The network device drive is responsible for the hardware communication control between the set top box and the network.

In another embodiment of the present invention, the application program interface and the media control layer are divided into separate functionality modules. These modules include channel control management, network call control and binary large object (BLOB) download control.

The other intelligent devices discussed above utilize the application program interface in a similar manner with their own specific implementation of the application program interface of the present invention. The specific implementation depends upon various factors including the type of information being transmitted, the type of communication, and whether the communication is one-way or two-way.

Applications that use the application program interface of the present invention become portable across intelligent devices. For instance, a navigation application in an interactive television environment that a set top box accesses to look at routes for a vacation might be the same application used to communicate with a mobile radio to send street and address information to a delivery truck.

An object of the present invention is to provide an application program interface for an intelligent device which includes an operating system that can communicate with a network.

Another object of the present invention is to provide an application program interface for an interactive television or multimedia networked system.

A further object of the present invention is to provide an application program interface for an interactive television, multimedia or client/server networked system that allows application programs to be written with a standardized set of input/output calls.

Another object of the present invention is to provide an application program interface for an interactive television, multimedia or client/server networked system that allows application programs to be written independent of the operating system on which they will run.

Still another object of the present invention is to provide an application program interface for an interactive television, multimedia or client/server networked system that allows application programs to be written independent of the network on which they will access servers.

Other objects, advantages, and novel features of the present invention will become apparent from the following detailed description of the invention when considered in conjunction with the accompanying drawings.

BEST MODES FOR CARRYING OUT THE INVENTION

Figure 1:
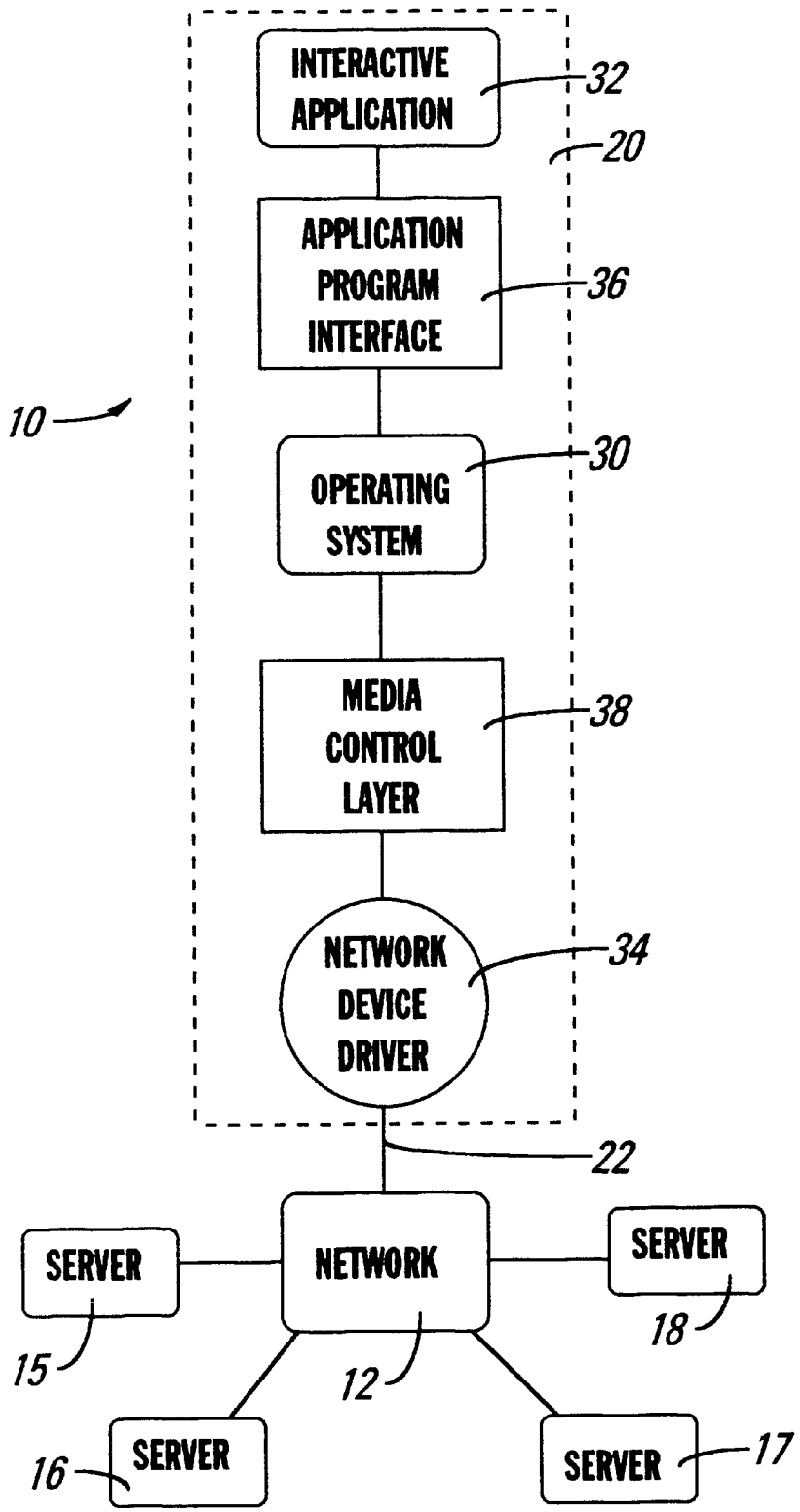
FIG. 1 is a block diagram of an interactive television system built in accordance with the present invention.

To assist in a better understanding of the invention, a description of different forms and embodiments of the invention will now be described in detail. Reference will be made to the accompanying drawings. Reference numbers and letters will be used in the drawings to indicate specific parts and locations on the drawings. The same reference numerals and letters will be used throughout the drawings unless otherwise indicated.

It is to be understood that the scope of the invention is not limited to the specific embodiments discussed herein. Additionally, for the purpose of best mode description, the following detailed disclosure primarily will focus on the application of the present invention to the set top box used in an interactive television system. However, it is to be understood that the present invention can be utilized in a similar fashion in virtually any networked, client/server systems utilizing intelligent devices including but not limited to cellular telephones, personal digital assistants (PDA's), personal computer/work station environments, smart phones, pagers and wireless communication networks and equipment. It should be understood that in some network environments, the server for one particular client may be another client. For example, in a cellular telephone system the client is a cellular telephone and the server is another cellular telephone which is also a client. Thus in some circumstances, while still accurately described as two separate client/server connections via a network, it may be easier to understand the communication structure by viewing it as two clients connected by a network.

Referring now to FIG. 1, a block diagram of an interactive television decoder (20), or some other digital consumer device, built in accordance with the present invention is shown as part of a networked multimedia system (10). The decoder (20) is connected to a network (12). Attached to the network (12) are servers (15, 16, 17 and 18). The connection (22) can be any type of network connection and can include telephone, cable television, fiber and wireless networks.

A detailed discussion of interactive television system can be found in U.S. patent application Ser. No. 08/480,930 to McClellan et al. for an "Operating System for Interactive Television System Set Top Box Utilizing Dynamic System Upgrades," now U.S. Pat. No. 5,619,250, which is hereby incorporated by reference in its entirety.

The set top box (20) includes an operating system (30), an interactive application (32) and a network device driver (34). The interactive application (32) is a high level application program which runs on the decoder (20). The operating system is the kernel of any digital device and in a preferred embodiment utilizes Microware Systems Corporation's OS-9 Real-Time Operating System. The network device driver (34) is the portion of the set top box which controls the network hardware during network accesses.

Particularly relevant to the present invention, the set top box or decoder (20) also includes an application program interface (API) (36) and a media control layer (38).

The interactive application (32) is a software program which is designed to run on the set top box (32) and access one or more of the servers (15–18) via the network (12). As the program runs, the program will need to access a server in order to send and to receive information. In order to do this, the interactive application will have to go through the operating system (30) and the network (12).

Without the present invention, the interactive application (32) would have to be written specifically for the particular operating system (30). Additionally, the interactive application (32) would have to be written specifically for the network (12) such that it can understand and use the network specific protocols to enable it to correctly access the network. The present invention provides an application program interface (36) which works in conjunction with the media control layer (38) which allows interactive applications to be written independent of the operating system and the network on which the interactive application (32) will be run.

The application program interface of the present invention is also referred to as ITEM which stands for Integrated Telecommunications Environment for Multimedia. Thus, if an interactive application is said to be written to ITEM, then it is written for decoder systems which include the API interface (36) of the present invention.

Figures 2, 3:
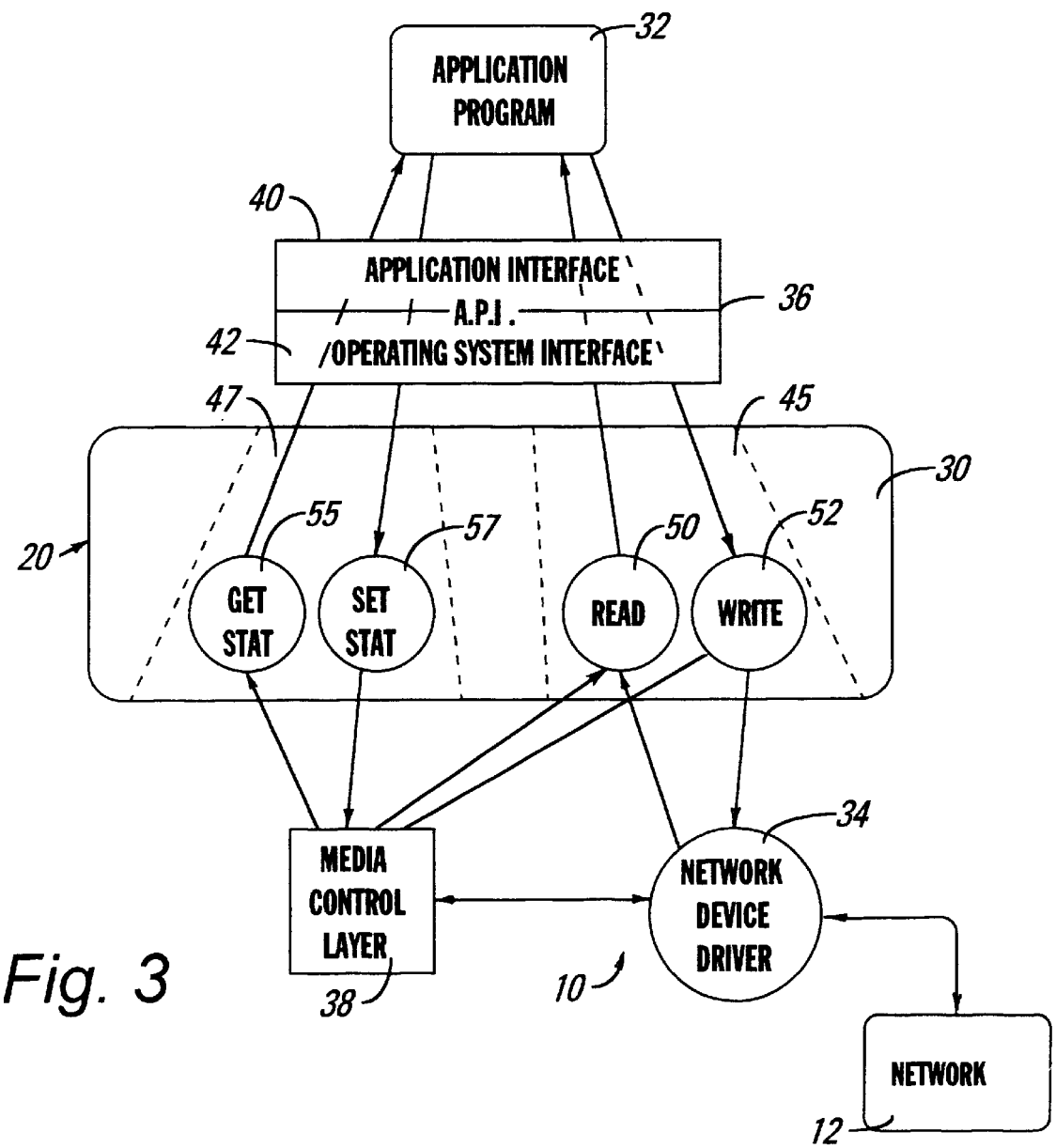
FIG. 2 is a block diagram of the application program interface.
FIG. 3 is a block diagram exemplifying the operation of the media control layer.

Referring now to FIG. 2, the application program interface (36) includes an application interface (40) and an operating system interface (42). The application interface (40) accepts requests from the ITEM interactive application for network accesses and control calls. The operating system interface is operating system dependent and translates the ITEM requests into the appropriate operating system input/output (I/O) calls. For example, in Microware's OS-9 operating system, the operating system interface (42) serves as either a linkable library or a trap handler.

If the operating system (30) was an operating system other than Microware's OS-9 operating system, then the operating system interface (42) would be different. The operating system interface (42) is written specifically for the operating system used in the decoder (20). The application interface (40) remains operating system independent. Therefore, by utilizing the API interface (36) and utilizing the operating system interface (42) appropriate for the operating system (30) used by the decoder (20), interactive applications (32) can be written to ITEM which remain independent of the operating system (30).

Referring now to FIG. 3, a block diagram of the networked multimedia system (10) is shown with illustrations of data I/O calls (45) and control I/O calls (47).

In a decoder (20), which does not include the application program interface (36) of the present invention, the application program (32), also referred to as the interactive application, must access the network entirely through read (50) and write (52) data I/O calls (45). For example, in order for the application program (32) to request network (12) service, the program must initiate a write (52) data I/O call through the operating system (30). This requires that the application program (32) be written specifically for the operating system (30) such that it will make the appropriate call. The message which the application program (32) is going to send to the network (12) must be in the format that the network (12) will understand. Thus the application must be network dependent so that it knows how to send the appropriate requests in a format the particular network understands.

Messages received from the network operate in a similar fashion. The network (12) returns a message to the operating system (30) through the network device driver (34). The application program must initiate a proper operating system read (50) I/O call (45). In order for the program (32) to make the proper read (50) I/O call (45), the program (32) must be operating system (30) dependent. That is, the application program must understand the operating system in order to make proper calls. In order to understand the message received, the program (32) also must be network (12) dependent.

With the present invention, application program I/O calls, both data (45) and control (47), are interfaced through the application program interface (36) which allows the program (32) to make all of its calls in the ITEM format independent of the particular operating system (30) and the particular network (12). The application program interface (36) operates in conjunction with the media control layer (38) to make this independent operation possible.

If the application program (32) wishes to initiate a network request, the application program sends a network request call to the application program interface (36). The application interface (40) portion of the application program interface (36) receives the request and passes it to the operating system interface (42) of the application program interface (36). The operating system interface (42) translates the ITEM request into the appropriate operating system (30) I/O call.

In the example of a network request, the API (36) would place the appropriate code, such as a 32-bit integer, in the set stat (55) register indicating that a particular network request is desired (i.e. make connection, answer an incoming call). The media control layer then formulates the appropriate message to send to the network. Thus, the media control layer is network dependent in the present invention and allows for the application program (32) and the API (36) to remain network independent. The appropriate network request message is sent by the media control layer (38) to the network device driver which is in charge of physically controlling the connection to the network. In other words, the media control layer (38) controls the content of the message sent to the network while the network device driver (34) controls the actual sending of the message over the physical network media.

Some network request messages sent by the media control layer (38) to the network (12) require a network response in order for the application request to be completed. For example, if the application initiates a "connect request" by the media control layer (38) by placing the appropriate message in the set stat register (57), the media control layer (38) generates the network dependent connect request message and sends it to the network device driver (34) for transmission to the network (12). This transaction may not be completed until the network (12) sends back a connection created or a connection denied message to the media control layer (38).

The media control layer (38) handles the result of the request by placing the appropriate message in the get stat register (55). The application (32) determines the result of the request by performing a get stat call which reads the get stat register (55). In the above example, the application (32) may perform a connection status get stat to find out if the connection request succeeded or failed.

The data I/O calls (45) are handled in a similar fashion. If the application program (32) wishes to send data, it sends the data to the API (36) which in turn initiates the proper operating system (30) write (52) data I/O call (45). The media control layer (38) reads the data from the write call (52) and translates it into a message or packet which the network (34) will understand by encapsulating the data with the proper headers and/or trailers as needed for network routing. The message or packet is sent to the network (12) via the network device driver (34). Data is received by the application program (32) in a similar but reverse manner through the read (50) data I/O call.

The following is the current summary of the Item application program interface calls:

| Call: | Description: |
|---|---|
| ite_dev_attach() | initializes a given infrastructure service |
| ite_dev_detach() | deinitializes a given infrastructure service |
| ite_path_open() | opens path between caller and infrastructure |
| ite_path_close() | service closes path between caller and stream handler service |
| ite_dev_getmode() | determines mode of device given a path-id |
| ite_dev_getname() | determines name of device given a path-id |
| ite_dev_gettype() | determines type of device given a path-id |
| ite_dev_setmode() | sets mode of device given a path-id |
| ite_path_clone() | creates clone of a path with a new path-id and connection |
| ite_path_dup() | creates new path ID which references same path |
| ite_path_txopget() | gets current transmit mode for sending data |
| ite_path_txopset() | sets current transmit mode for sending data |
| ite_path_push() | pushes protocol or hardware driver onto path |
| ite_path_pop() | removes driver on top of protocol stack |
| ite_data_avail_asgn() | allows caller notification that data is available |
| ite_data_avail_rmv() | allows caller to remove data notification |
| ite_data_ready() | queries for size of incoming data which is ready |
| ite_data_read() | gets data from the infrastructure |
| ite_data_readmbuf() | returns one mbuf packet chain in mb_ptr |
| ite_data_write() | writes data through the infrastructure |
| ite_data_writembuf() | accepts mbuf for transmission through protocol stack |
| ite_chn_change() | change viewing channel |
| ite_chn_info_asgn() | notifies of any changes in channel list information |
| ite_chn_info_rmv() | removes change notice in channel list information |
| ite_dc_read () | reads data from the data carousel (cyclical broadcast) |
| ite_dc_ready() | returns size of object in the index |
| ite_ctl_addrset() | sets address information for ITEM path |
| ite_ctl_answer() | answers incoming call on a given path |
| ite_ctl_connect() | establishes end-to-end connection between |

-continued

| Call: | Description: |
|---|---|
| | devices |
| ite_ctl_connstat() | returns connection status for the path |
| ite_ctl_disconnect() | disconnects end-to-end connection |
| ite_ctl_rcvrasgn() | set up path to receive incoming calls |
| ite_ctl_rcvrrmv() | removes incoming call notification request |
| ite_ctl_suspend() | secondary signalling call suspends current active call |
| ite_ctl_resume | resumes a previously suspended call |
| ite_fehangup_asgn() | notifies far end hang up during the call |
| ite_fehangup_rmv() | removes hangup notification request |
| ite_linkdown_asgn() | notifies if any layer in protocol stack's link fails |
| ite_linkdown_rmv() | removes link down notification request |
| ite_ctl_resadd() | adds in-band resources to current out of band connection |
| ite_ctl_resdel() | deletes in-band resources to current out of band connection |
| ite_ibreschg_asgn() | notifies any change in in-band resource list |
| ite_ibreschg_rmv() | removes in-band resource change notification request |
| ite_ctl_reslist() | returns in-band resources list for current out of band connection |
| ite_dnld_initiate() | causes infrastructure to initiate download procedure |
| ite_dnld_modvalidate() | performs module validation on downloaded "BLOB" |

Figure 4:
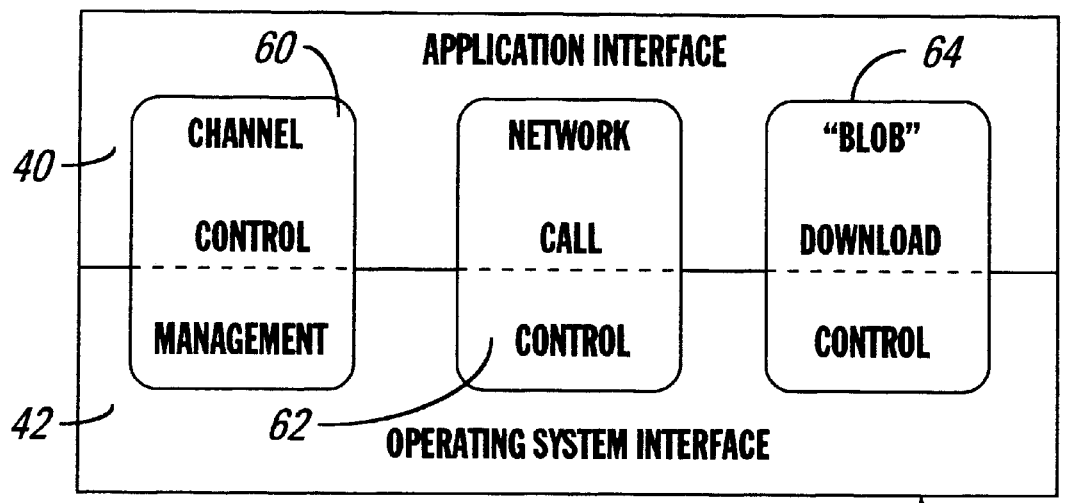
FIG. 4 is a block diagram of another embodiment of the application program interface.

Referring now to FIG. 4, in another embodiment of the present invention, the application program interface (36) is divided into distinct functionality modules. In the present embodiment, the API (36) includes three modules: the channel control management module (60), the network call control module (62) and the binary large object (BLOB) download control module (64). As can be seen, the division of the API (36) is vertical and cuts through the division line between the application interface (40) and the operating system interface (42). For example, when the application interface (40) receives and I/O call relating to channel control, the application interface (40) will utilize the channel control management module (60) API calls. The operating system interface (62) will utilize the channel control management module API calls to translate the I/O call received by the application interface (40) and translate it into the proper operating system call. I/O calls for network call control and BLOB download control are handled in a similar manner.

Figure 5:
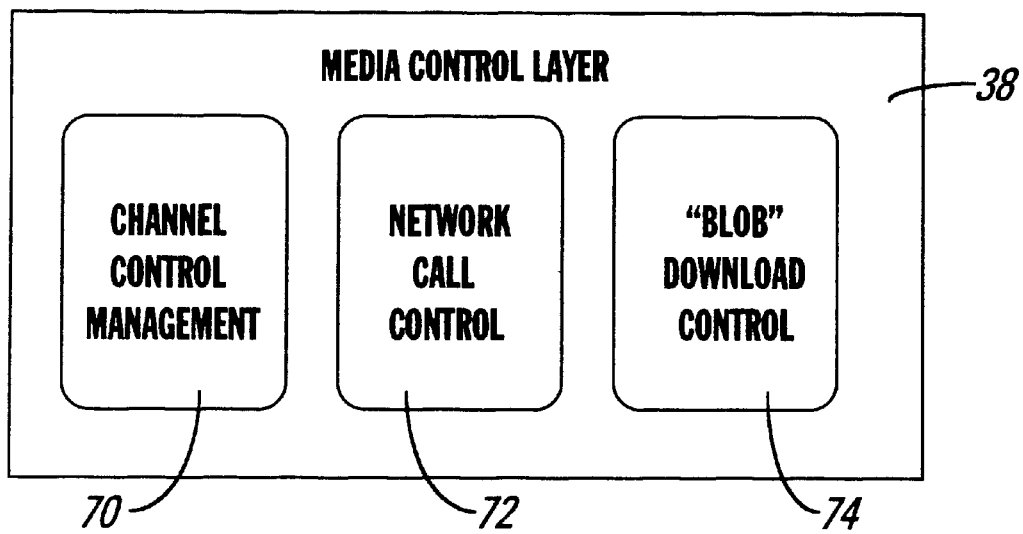
FIG. 5 is a block diagram of the media control layer.

Referring now to FIG. 5, when the API (36) is divided into separate functionality modules (60, 62 and 64), the media control layer (38) is divided into corresponding modules (70, 72 and 74). Thus, when an I/O call is received by the API (36) and is routed through the network call control module (62) of the API (36), it will be handled at the media control layer (38) by the network call control module (72) of the media control layer (38). I/O calls from the API (36) for channel control management and BLOB download control are handled in analogous manner.

The API (36) and the media control layer (38) need not always consist of all three functionality modules. In some situations only one or two of these modules may be necessary. In other situations the functionality may be divided in an alternate manner or not divided at all. These variations are simply different functionality division schemes and variations such as these should be considered within the scope of the present invention.

Figure 6A:
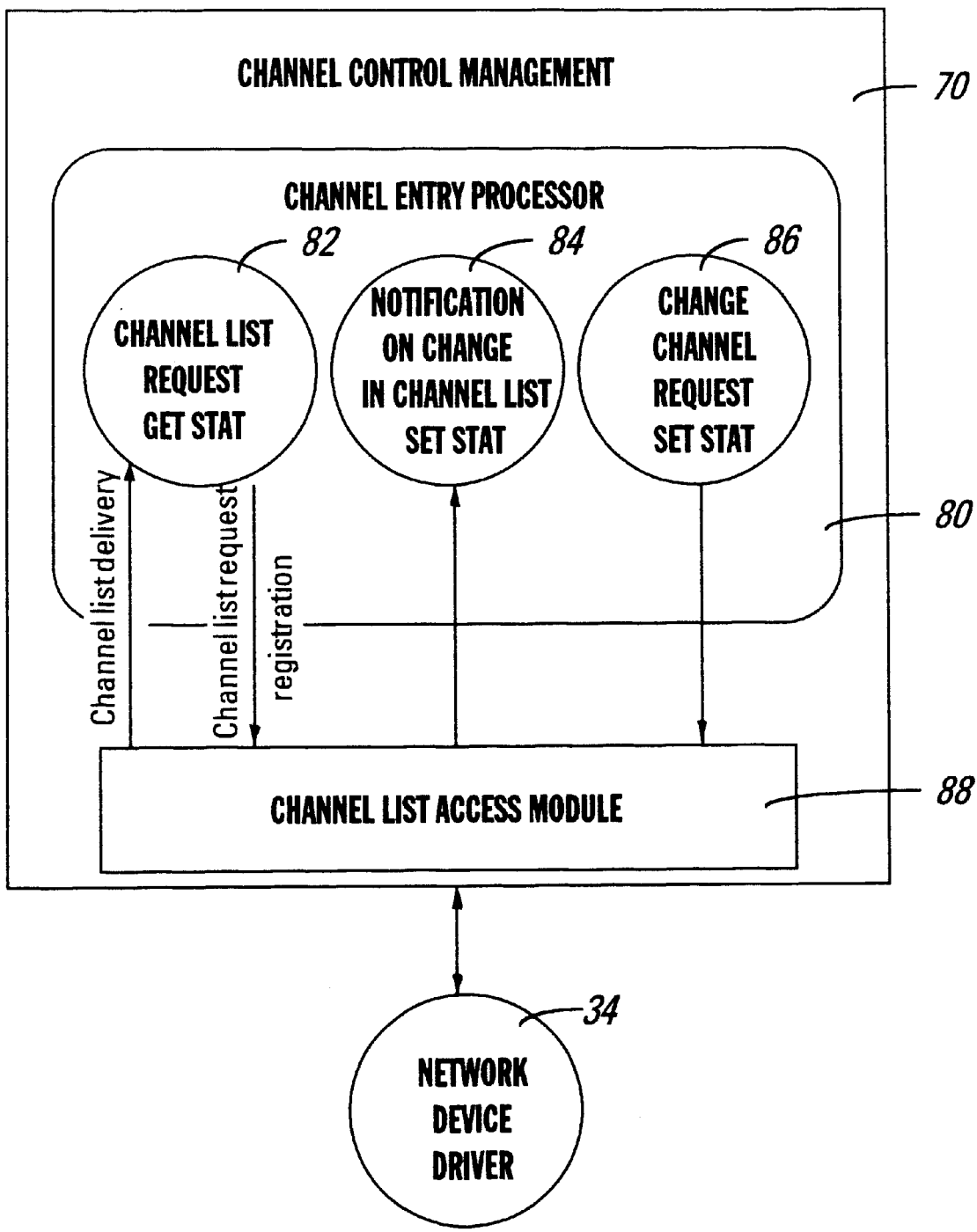
FIG. 6A is a detailed block diagram of the channel control management module.
Figure 6B:
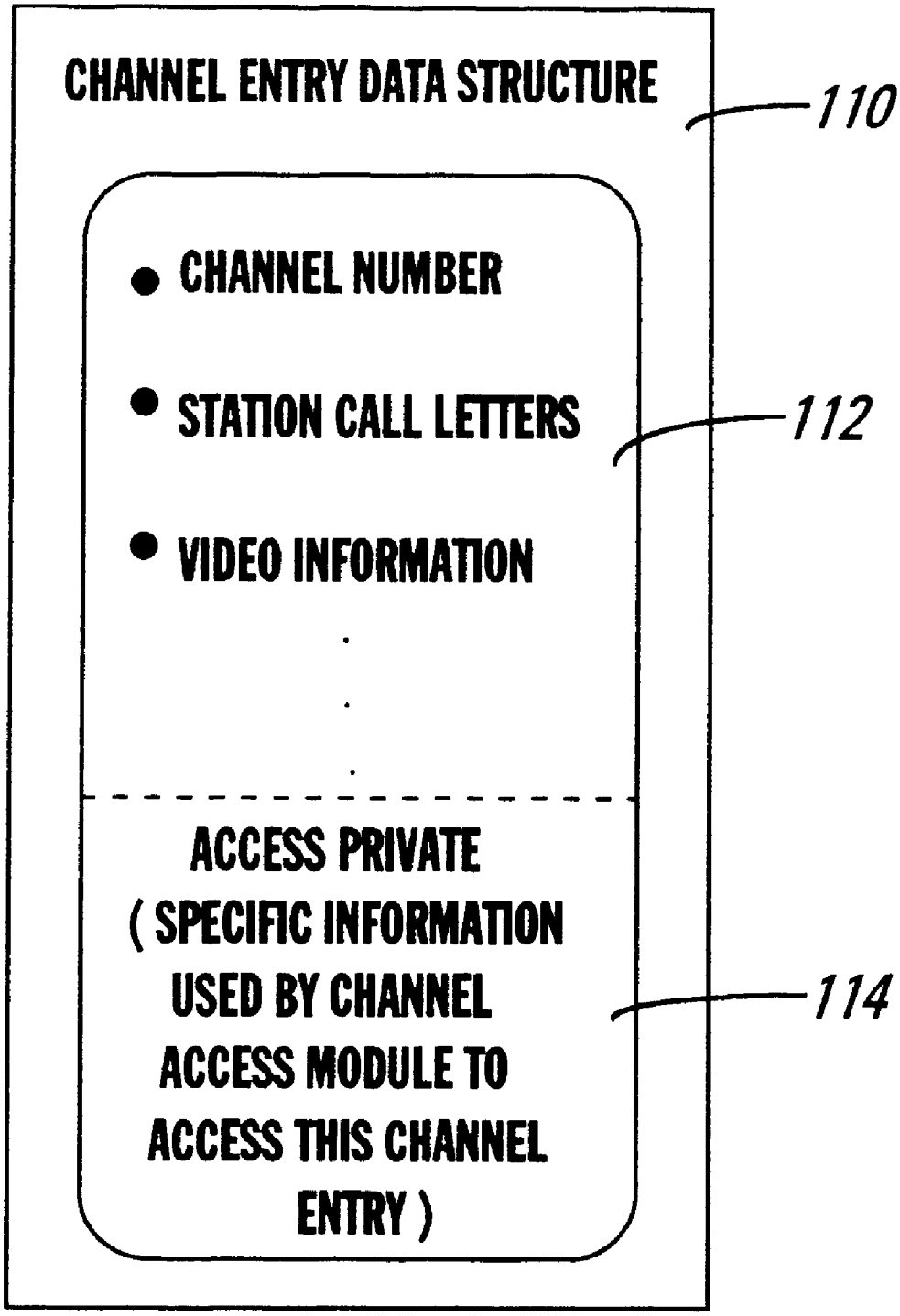
FIG. 6B is a detailed block diagram of the channel entry data structure used for standardized channel management.

Referring now to FIGS. 6A and 6B, a detailed view of the channel control management module (70) within the media control layer (38) is shown. The channel control management module (70) may actually consist of one or more operating system modules. This particular embodiment shows the channel control management module (70) divided into two modules: the channel entry processor (80) and the channel list access module (88). The channel entry processor (80) consists of three functional pieces: the channel lists request get stat (82), the notification on change of channel set stat (84), and the change channel request set stat (86).

The channel list request get stat (82) is called on initialization when an application would like to get the entire channel list and when channel list updates are needed. Another responsibility of the channel list request get stat (82) is to organize the network specific channel list coming in off the network (12) into standard channel entry data structures (110) before passing the list up to the application.

The application may also request notification on change of channel list. The notification is registered with notification on change in channel list set stat (84). When the application requests a change in channels, the corresponding channel entry data structure (110) is passed to the change channel request set stat (86). The channel entry data structure (110) consists of channel profile information which can be used by the application to do on screen display (112) and access private information (114) which tells the channel list access module (88) how to access the channel.

The channel list access module (88) contains knowledge of how to access channel list information as well as knowledge of how to interpret access private data in the channel entry data structure (110).

Figure 7:
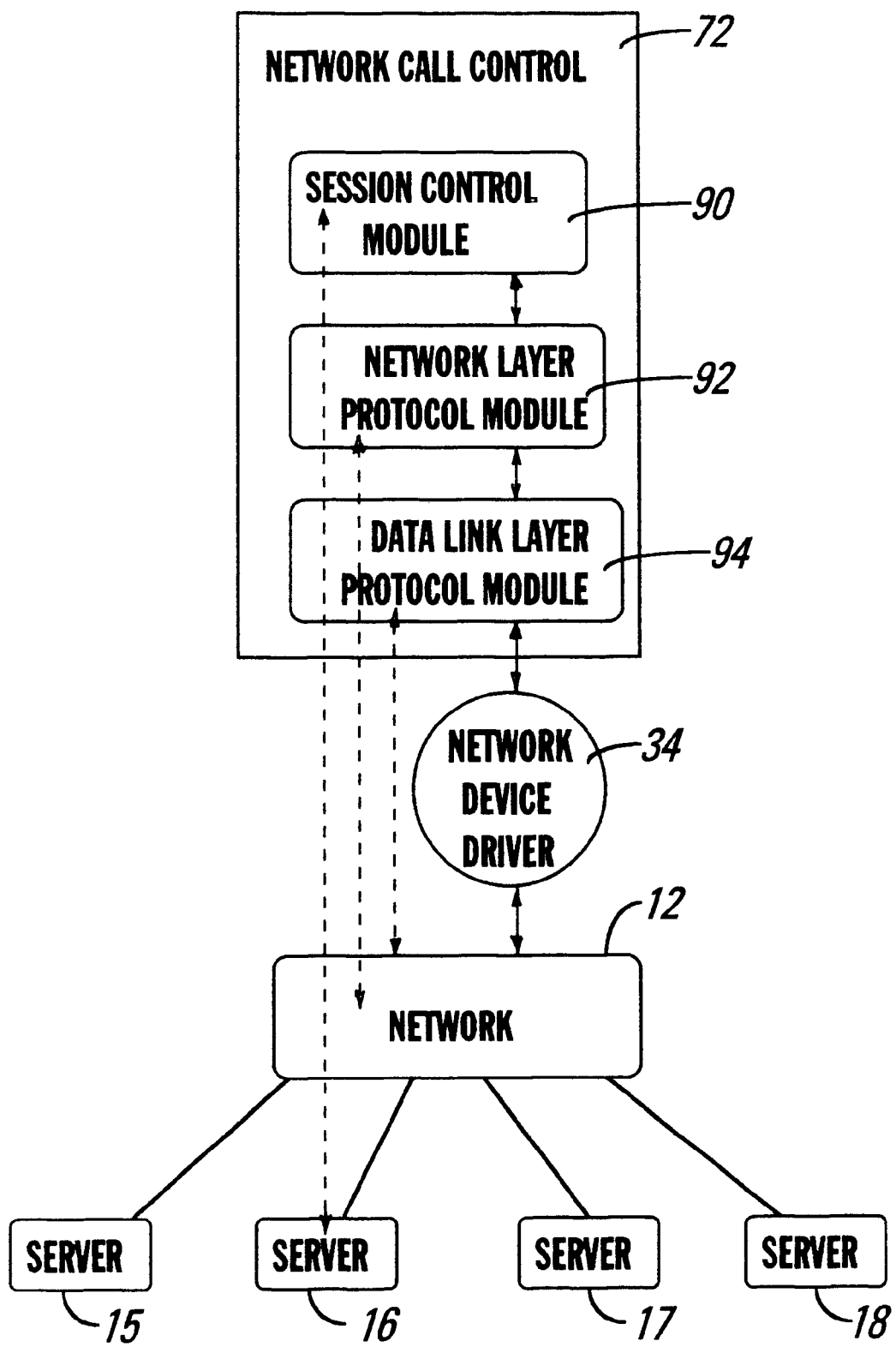
FIG. 7 is a detailed block diagram of the network call control module.

Referring now to FIG. 7, a detailed view of the network call control module (72) is shown. The network call control module (72) may consist of one or more operating system modules. The present embodiment creates a module per layer in the standard open interconnect (OSI) model. The session control module (90) communicates with the network (12) to establish and to partition sessions between a decoder (20) and a server (15, 16, 17 and 18). The result of the session network bandwidth is allocated between the decoder and a server to perform the service requested by the user.

The network layer (92) and the data link layer (94) are typically standard, publicly specified protocols such as X.25, LAP-B, or ATM QSAAL. In short, these protocols can communicate over any standard communication media including wireless, fiber optics, coax, or twisted pair wire. The functionality of the network layer (92) and the data link layer (94) is consistent with the generic functionality of OSI layers 2 and 3, however implementation will be specific to a particular protocol.

The network call control organization at the API, as well as the network call control, is applicable to equipment other than multimedia devices and can be used in devices such as cellular telephones, personal digital assistants (PDA's), personal computer/work station environments, smart phones, mobile radios, pagers and wireless communication networks and devices.

Figure 8:
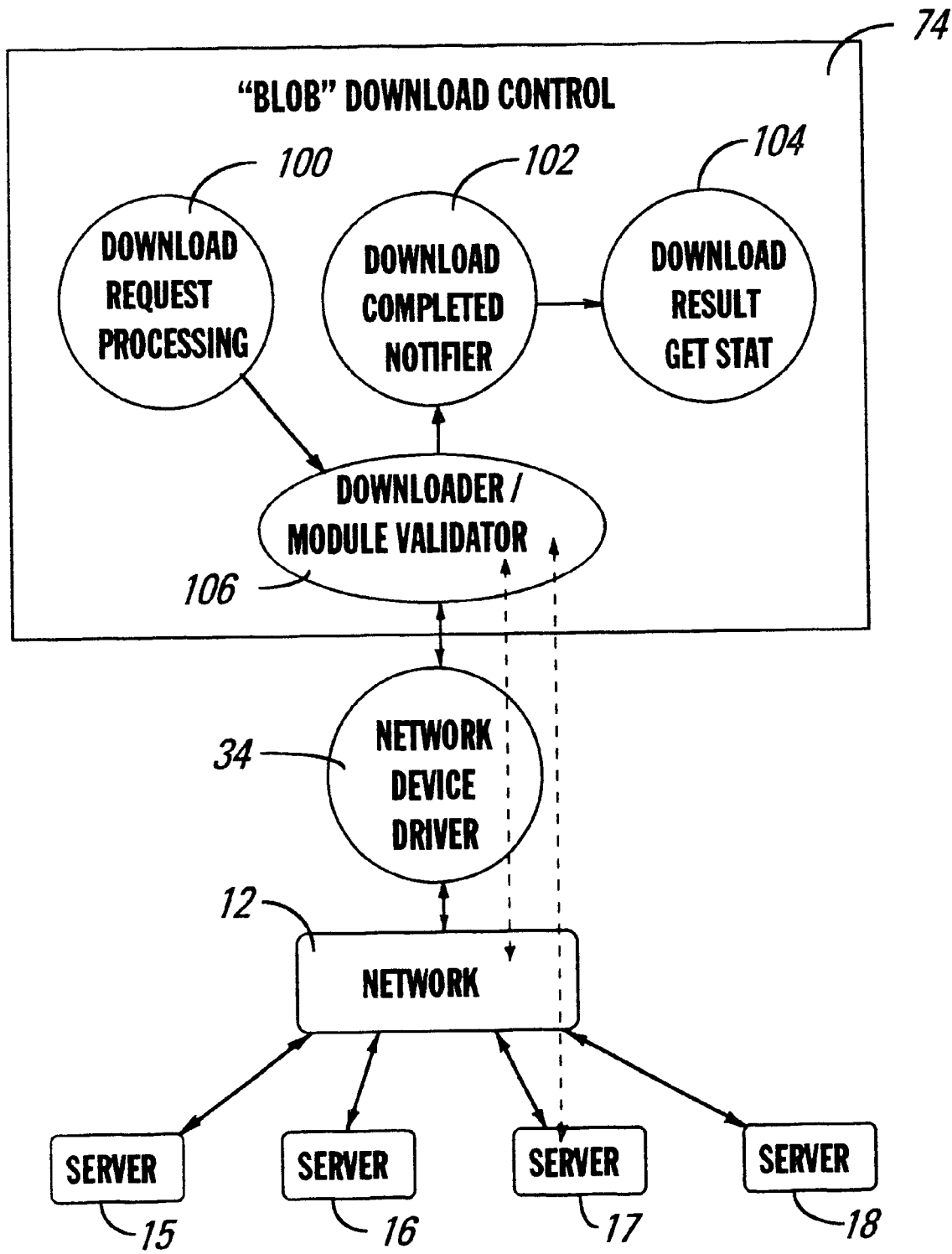
FIG. 8 is a detailed block diagram of the binary large object download control module.

Referring now to FIG. 8, a detailed view of the binary large object (BLOB) download control module (74) is shown. The present embodiment includes only one operating system module though it is possible to divide the functionality into multiple modules.

The download request processing (100) accepts the request for download by the application program (32) and determines the validity of the request. The downloader/module validator (106) performs the actual download protocol between the decoder (20) and either the network (12) or the servers (15, 16, 17 and 18). Once the application modules are downloaded, they will be validated to ensure that they are in the correct format for the operating system on the decoder (20). The validation process

We claim:

1. An intelligent communication device with an operating system for running an application program over a network wherein said application program is written independently of said network and of said operating system, said device comprising:

an application program;

a network independent application program interface having an application interface and an operating system interface;

an operating system;

a network dependent media control layer;

a network device driver;

a network hardware connection controlled by said network device driver;

at least one server connected to said network;

wherein said network independent application program interface is functionally positioned between said application program and said operating system, and said application program communicates with said application interface and said operating system interface communicates with said operating system; and wherein said network dependent media control layer is functionally positioned between said operating system and said network device driver to allow communication between said operating system and said network dependent device driver.

2. The invention in accordance with claim 1 wherein said application interface includes means for receiving network and server requests from the application program;

wherein said received requests are in a standardized format which is independent of the particular operating system;

wherein said operating system interface includes means for receiving the standardized requests from the application interface; and wherein said operating system interface includes means for translating said standardized requests into requests formatted for the particular operating system.

3. The invention in accordance with claim 2 wherein said media control layer includes means for receiving request initiated by the application program from said operating system after having been translated by said operating system interface; and wherein said media control layer includes means for translating and formatting said request into a message or packet which is appropriate for the network.

4. The invention in accordance with claim 3 wherein said media control layer includes network call control module means for enabling network specific communication.

5. The invention in accordance with claim 4 wherein said application program interface includes a network call control module;

wherein said network call control module of said application program interface includes means for receiving the network requests from the application program relating to call controls specific to the network; and wherein said network call control module of said application program interface includes means for translating the requests from the application program relating to call controls specific to the network into a request formatted for the particular operating system.

6. The invention on accordance with claim 4 wherein said network call control module means includes means for processing the network layer protocol, and means for processing the data link layer protocol.

7. The invention in accordance with claim 6 wherein said network call control module means includes means for processing the session control.

8. The invention in accordance with claim 3 wherein said media control layer includes BLOB download control module means for receiving binary large objects through the network.

9. The invention in accordance with claim 8 wherein said application program interface includes a BLOB download control module, wherein said BLOB download module control module of said application program interface includes means for receiving the network requests from the application program relating to binary large object downloads; and wherein said BLOB download control module of said application program interface includes means for translating the requests from the application program relating to binary large object downloads into a request formatted for the particular operating system.

10. The invention in accordance with claim 3 wherein said media control layer includes channel control management module means for processing network specific channel management.

11. The invention in accordance with claim 10 wherein said application program interface includes a channel control management module, wherein said channel control management module of said application program interface includes means for receiving the network requests from the application program relating to channel management specific to the network, and wherein said channel control management module of said application program interface includes means for translating the requests from the application program relating to channel management specific to the network into a request formatted for the particular operating system.

12. The invention in accordance with claim 10 wherein said channel control management module means includes means for accessing channel lists; means for providing notification that there is a change in the channel list, and means for requesting a specific channel.

13. The invention in accordance with claim 10 wherein said channel control management module means includes channel entry data structure means for storing channel information, said channel information including channel number, station call letters, and network access information for the channel.

14. An intelligent communication device with an operating system for running an application program over a network wherein said application program is written independently of said network and of said operating system, said device comprising:

an application program;

a network independent application program interface having an application interface and an operating system interface;

an operating system;

a network dependent media control layer;

a network device driver;

a network hardware connection controlled by said network device driver;

at least one server connected to said network;

wherein said network independent application program interface is functionally positioned between said application program and said operating system, and said application program communicates with said application interface and said operating system interface communicates with said operating system;

wherein said network dependent media control layer is functionally positioned between said operating system and said network device driver to allow communication between said operating system and said network dependent device driver;

means for receiving network and server requests from the application program, wherein said network and server requests are received in a standardized network independent format;

means for translating said standardized requests into a request formatted for the particular operating system; and means for translating and formatting said request into a network dependent message packet with is appropriate for said network, thereby controlling the content of said message or packet, said means functionally positioned between said operating system and said network.

15. The invention on accordance with claim 14 wherein said means for translating said standardized requests into a request formatted for the particular operating system is functionally positioned between the application program and the operating system.

16. The invention in accordance with claim 14 wherein said means for translating and formatting said requests in to a message or packet which is appropriate for said network is functionally positioned between said operating system and said network.

17. The invention in accordance with claim 14 wherein said means for translating and formatting said request into a message or packet which is appropriate for said network includes network call control module means for enabling network specific communication.

18. The invention in accordance with claim 14 wherein said means for translating and formatting said requests into a message or packet which is appropriate for said network includes BLOB download control module means for receiving binary large objects through the network.

19. The invention in accordance with claim 14 wherein said means for translating and formatting said requests into a message or packet which is appropriate for said network includes channel control management module means for processing network specific channel management.

20. A method of running an application program on an intelligent communication device with an operating system over a network wherein said application program is written independently of said network and of said operating system, said method comprising:

providing an application program;

providing a network independent application program interface having an application interface and an operating system interface;

providing an operating system;

providing a network dependent media control layer;

providing a network device driver;

providing a network hardware connection controlled by said network device driver;

providing at least one server connected to said network;

wherein said network independent application program interface is functionally positioned between said application program and said operating system, and said application program need only communicate with said application interface and said operating system interface communicates with said operating system;

wherein said network dependent media control layer is functionally positioned between said operating system and said network device driver to allow communication between said operating system and said network dependent device driver;

receiving network and server requests from said application program, wherein said network and server requests are received in a standardized network independent format;

translating said standardized requests sent between said application program and said operating system into a request formatted for the particular operating systems; and translating and formatting said network requests sent between said operating system and said network into a network dependent message or packet which is appropriate for said network, thereby controlling the content of said message or packet.

* * * * *